Patented Dec. 20, 1949

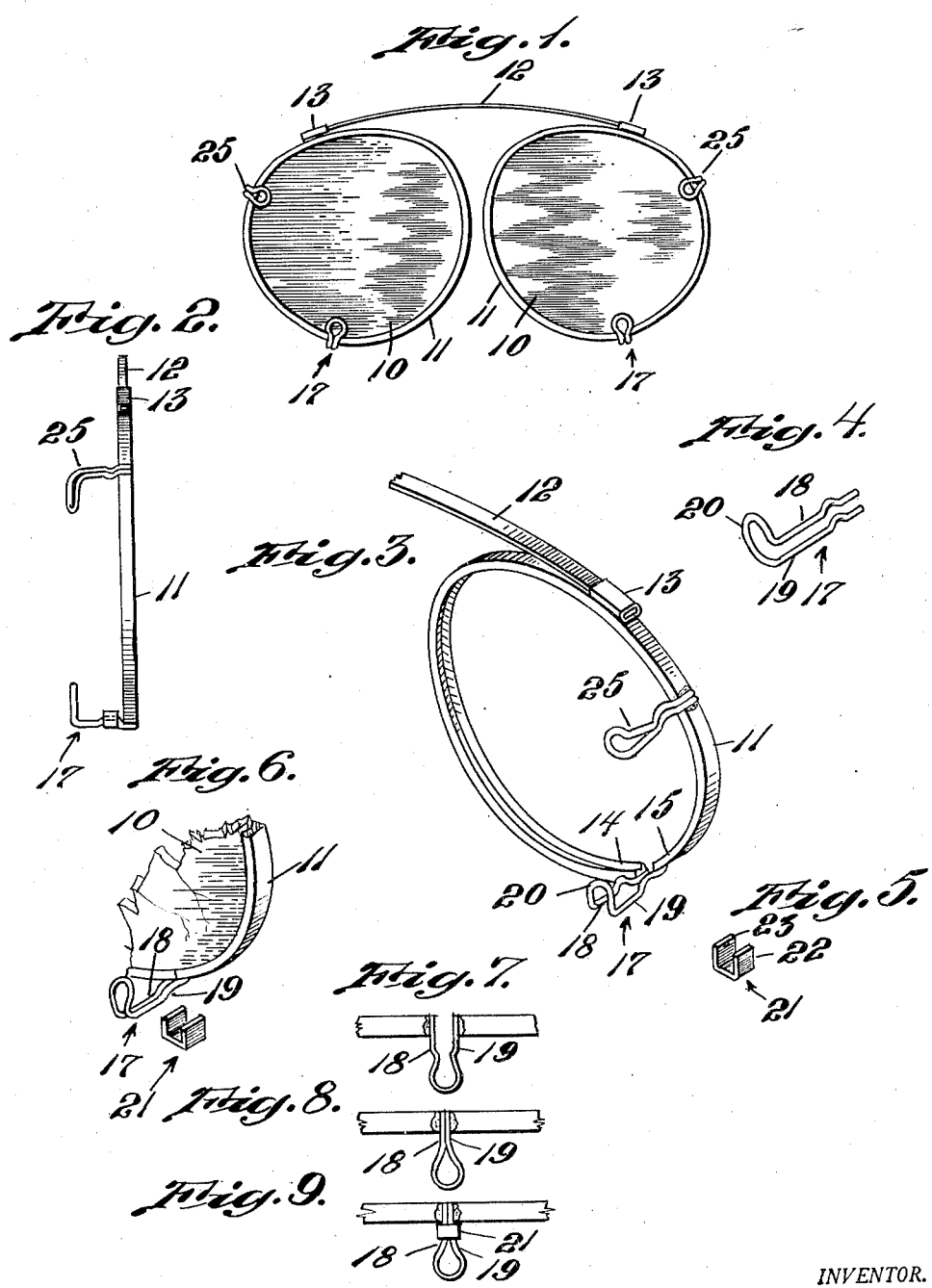

2,492,072

UNITED STATES PATENT OFFICE 2,492,072

ATTACHMENT FOR OPHTHALMIC MOUNTINGS

Burton M. Tapner, North Scituate, R. I., assignor to Welsh Manufacturing Company, a corporation of Rhode Island Application August 20, 1947, Serial No. 769,728

5 Claims. (Cl. 88—41)

This invention relates to an attachment for an ophthalmic mounting, sometimes called a hookover, as the device is provided with hook-like members to engage the edges or rims of an optical frame or mounting and is retained in place by a resilient bridge.

One of the objects of this invention is to provide a simpler manner of mounting the lens in the attachment frame.

Another object of this invention is to utilize one of the hooks which serves to mount the attachment as a means for mounting or retaining the lenses in the frame.

Another object of this invention is to provide a more resilient mounting for the lenses in the attachment so that there will be less chance of breakage of the lenses.

Another object of this invention is to improve the appearance of the attachment.

A further object of the invention is to provide an attachment which may be constructed at much less cost.

With these and other objects in view, the invention consists of certain novel features of construction as will be more fully described and particularly pointed out in the appended claims.

In the accompanying drawings:

Fig. 1 is a rear view of the attachment complete;

Fig. 2 is an edge elevation;

Fig. 3 is a perspective view illustrating on a larger scale one of the lens and two of the attaching members secured thereon;

Fig. 4 is a perspective view of one of the attaching members separate from the rim;

Fig. 5 is a perspective view of a band for embracing one of the attaching members;

Fig. 6 is an exploded view illustrating the attaching member and securing band;

Fig. 7 is a fragmental view of the ends of the frame showing the attaching member secured in position with the ends of the frame separated;

Fig. 8 is a view similar to Fig. 7 with the ends of the frame together;

Fig. 9 is a similar view illustrating the band as positioned about the attaching member.

Instead of splitting the rim for each of the lenses and attaching a short barrel to each end with a screw extending through the barrels to join them together, I provide the ends of the rim at the location of one of the attaching members or hooks and form this hook with two arms, one arm attached to one end of the rim and the other arm attached to the other end of the rim, these two arms being one and the same piece of material and, by this relation, the arms may be sprung apart for the insertion of the lens or moved together into close adjacency and there either held by the inherent spring of the stock of the two-armed member or the whole may be supplemented by a band which embraces the two arms.

With reference to the drawings, 10—10 designates the two lenses or shade glasses which are utilized. These are each encircled by a rim 11—11 and these two rims are attached together by a spring bridge 12 at its ends 13—13 usually by soldering a tubular part to each of the rims which part receives the spring bridge 12.

Each rim 11 is provided with separable ends 14 and 15, and an attaching member or hook designated generally 17, as shown in Fig. 4, is attached to these ends. This attaching member or hook has arms 18 and 19 formed by being bent from a length of wire doubled as at 20 and bent generally into hook shape. One of these arms 18 is secured to the end 14 of the rim, while the other arm 19 is secured to the end 15 of the rim. Thus, the two ends of the rim are joined together through the attaching member, as shown more clearly in Fig. 3. Thus, if it is desired to mount the lens 10 in position in the rim 11, it is merely necessary to spread apart the ends 14 and 15 for the reception of the lens after which the inherent spring of the stock of the attaching member 17 will close the ends toward each other until the rim firmly grips the lens 10. This resilient action also provides for a resilient and yet firm mount under different temperature conditions of the lens and serves to permit sufficient expansion so that there will be less chance of cracking or breaking the lens or chipping the edges thereof.

In some cases, it is desirable to additionally secure the ends of the rim together by means of a band designated generally 21 having arms 22 and 23 which serve to receive the arms 18 and 19 of the attaching member and by embracing them positively prevent them being separated so that the lens cannot escape from the rim.

In order that the attachment may be mounted upon some spectacle or other ophthalmic mounting, a second hook or attaching member 25 is provided at a point spaced from the attaching member 17, and this attaching hook 25 may be of the same form as the attaching hook 17 for symmetry or general appearance although it will be realized that it is not necessary that a two-armed hook be here provided as there is no separation of the ends.

I claim:

1. An attachment for an ophthalmic mounting comprising a pair of lens rims connected by a spring bridge, each of said lens rims having separable ends for the insertion of a lens, an attaching member of U shape extending on each rim at generally right angles to the plane of the lens rim, said member on each lens rim having two arms with one arm attached to one of said separable ends and the other arm being attached to the other of said separable ends with their connecting portion sufficiently flexible for movement of said ends and arms attached thereto toward each other to bind the lens in the rim.

2. An attachment as in claim 1 wherein said two-arm member is of a material capable of being bent to determine the spacing between said separable ends for the insertion or removal of a lens.

3. An attachment as in claim 1 wherein said two-arm member is of a resilient material capable of expansion for the positioning of a lens in place.

4. An attachment as in claim 1 wherein said member is formed of a length of wire doubled upon itself to provide said two arms.

5. An attachment as in claim 1 wherein a band is wrapped about the two arms of said member to hold them together.

BURTON M. TAPNER.

REFERENCES CITED

The following references are of record in the file of this patent:

UNITED STATES PATENTS

| Number | Name | Date |
| --- | --- | --- |
| 150,557 | Fricke | May 5, 1874 |
| 1,483,745 | Propson | Feb. 12, 1924 |
| 2,076,293 | Colliander | Apr. 6, 1937 |
| 2,089,236 | Welsh | Aug. 10, 1937 |

FOREIGN PATENTS

| Number | Country | Date |
| --- | --- | --- |
| 351,356 | France | May 5, 1905 |